Patented Feb. 26, 1952

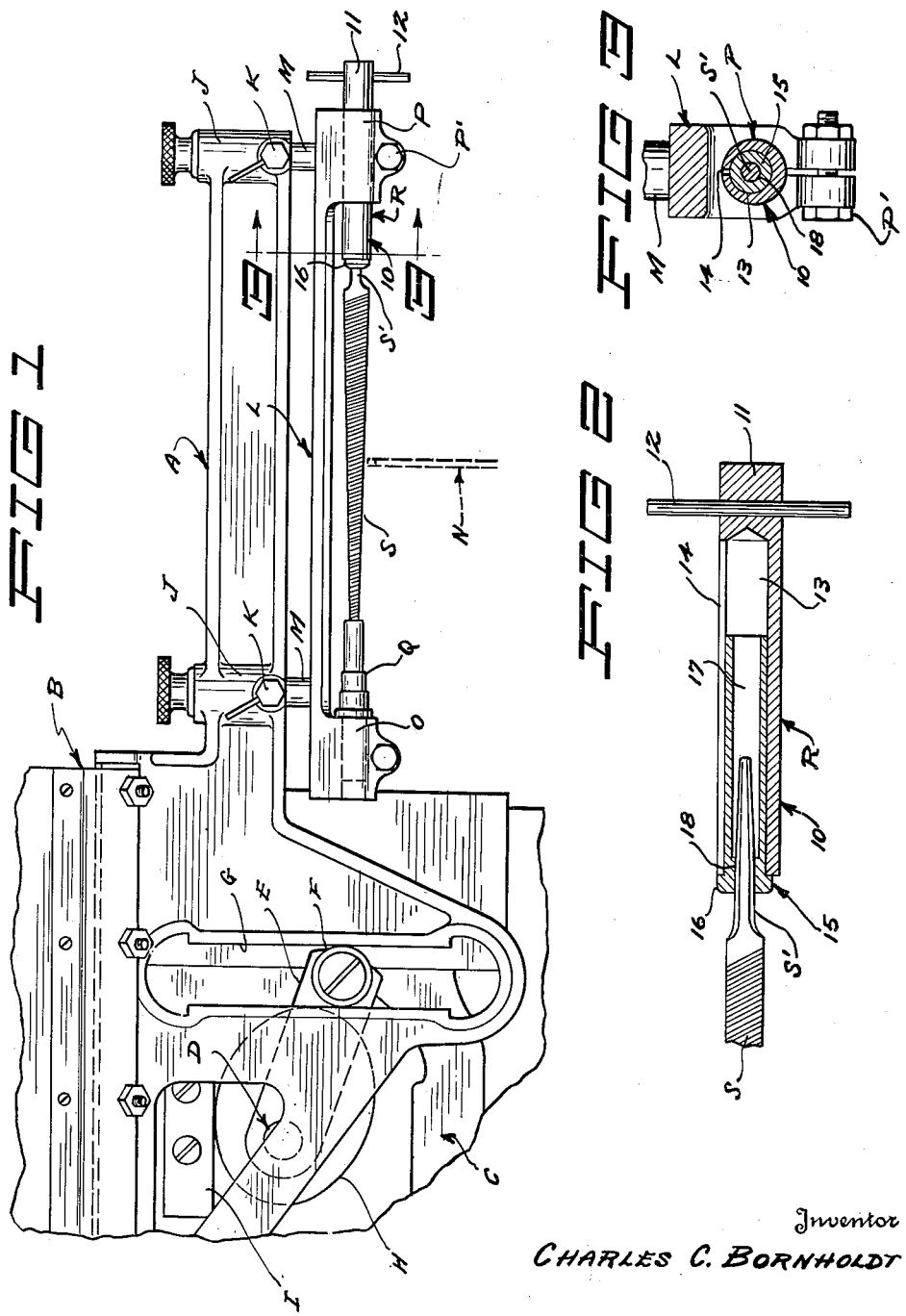

2,587,102

UNITED STATES PATENT OFFICE 2,587,102

FILE HOLDER FOR SAW FILING MACHINES

Charles C. Bornholdt, Rochester, Minn.

Application September 1, 1949, Serial No. 113,582

2 Claims. (Cl. 76—31)

This invention relates generally to improvements in saw filing machines, used for filing hand saws and the like, and more particularly to improvements in the holder by which the file is held and operated across the saw teeth.

In the type of saw filing machine to which my invention has reference, the saw is held in carriage, toothed edge up, and is moved past the filing point automatically in synchronism with the operation of a file holder frame which is reciprocated endwise, angularly across the teeth. The frame, as it travels in one direction or on its working stroke, moves downwardly to bring the file against the teeth, and on its return stroke moves upwardly to clear the teeth. The entire machine is power operated and the file is carried at its opposite ends in socketed holders which are clamped in the frame and arranged for up and down adjustments as may be necessary.

The files used in such machines are of the usual triangular or three cornered, tapered variety and at present considerable difficulty is encountered in properly and accurately aligning the files with reference to their direction of travel on the working stroke, due largely to minor irregularities in the file tangs. Such tangs are, in most cases, not straight and are irregularly surfaced with the result that when placed in the present holders the working edge of the file travels at a slight sideward angle causing them to cut a flat at the bottom of the valleys between adjacent saw teeth.

In accordance with my invention, and as its primary object I provide an adjustment holder for the tang ends of the files, by which the files may be shifted through a minor but entirely sufficient range to line up their cutting edges exactly and accurately, thus compensating for the irregularities in the files and insuring the perfect filing of the saw teeth. Another object is to provide a file holder of this character which is extremely simple in construction, convenient in operation, and capable of being installed in the present day saw filers without alteration thereof.

These and other more detailed and specific objects will be disclosed in the course of the following specification reference being had to the accompanying drawings, in which—

Fig. 1 is a fragamentary side elevation of the file holder frame of a conventional saw filing machine, and associated parts, and showing a file supported and held on the frame by a holder according to my invention.

Fig. 2 is an enlarged longitudinal and diametrical sectional view through the file holder of my invention, as removed from the machine, and showing the adjacent tang end of the file.

Fig. 3 is an enlarged sectional view along the line 3—3 in Fig. 1.

Referring now more particularly and by reference characters to the drawing, A designates the file carrier frame of a commercially available saw filing machine, and this frame is slidably carried in a slide B on a frame C. A power operated shaft D carries a crank arm E on which is an eccentric pin F playing in a vertical slot G in the frame A so that rotation of the shaft will reciprocate the frame A right and left as viewed in Fig. 1. The shaft D also carries a cam H which operates against a cam lug I to lower the frames A and C as frame A moves to the left on its working stroke and then raise it as it moves rightward on its return stroke.

The file carrier frame A has spaced vertical guides J with clamp screws K and a file holder frame L is provided having upright shanks M positioned in said guides. Adjustment of the shanks M obviously will raise and lower the file holder frame L with reference to the saw being filed, which is shown in dotted lines at N in Fig. 1. The file holder frame has opposed, spaced and split clamps O and P and in each there is mounted a socketed file holder, indicated at Q and R respectively, for engaging the opposite ends of a conventional triangular file S thus holding it parallel with and below the frame in position to traverse and file the saw N as the file frame assembly reciprocates as previously described. The holder Q at the inner end of the assembly, and engaging the small end of the file S is conventional in the machine, while the other holder R differs from the usual to embody my invention, as will now be described.

In accordance with my invention the holder R comprises male and female parts, consisting of an outer sleeve member 10 of a diameter such as to nicely fit the clamp P in which it may be secured in any adjusted position by pulling up the clamp bolt P' tight, as will be readily understood. The sleeve member 10 is closed at its outer end 11 and has a diametrically fixed rod 12 by which it may be turned in the clamp. The sleeve member then has a longitudinally extending bore 13 opening through its inner end and a slit 14 extends along one side, being coextensive with said bore. The bore 13 accommodates the inner part of the holder, which is in the form of a cylindrical socket member or plug 15 shaped to slip into the bore and with a diametrical enlargement 16 at its outer end.

The member 15 is provided also with a bore 17 and a socket 18 into which the tang ends S' of the file S may be fitted.

When properly assembled in the clamp P the outer sleeve member 10 supports the inner socket member 15 so that it may be thrust home on the tang S' to support the file S as seen in Fig. 1. But, as shown in Fig. 3, the bore 13 is eccentric to the axis of the sleeve member 10 and thus, by rotating the sleeve in the clamp, the socket member 15 may be shifted in all directions to thus properly straighten and align the file with reference to the line on which it is reciprocated. When such adjustment has been made it is, of course, locked by pulling the clamp bolt P' tight and the split sleeve will constrict and clamp the socket member.

I find that I may, by the proper rotary adjustment of the sleeve member, compensate for the usual minor variations in files, and irregularities in their tangs, to secure extremely accurate alignment and filing of sharp valleys between the saw teeth as necessary to most efficient sharpening thereof.

The improved holder R of my invention may replace that usually found in the filing machines without alteration thereof and the file, and socket member 15 will be held against rotation, while the tang end of the file is shifted, by the other socket Q which secures the opposite end of the file.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. For a saw filing machine using a conventional three cornered file and having a reciprocating frame with opposed clamps and a holder in one clamp for engaging one end of the file, the improvement which consists in a holder having an outer sleeve member rotatably positioned in the other clamp, said sleeve member having a bore eccentric to its axis of rotation, and a socket member positioned in the bore and engaging the opposite end of the file, said sleeve member having means for rotating it in the clamp.

2. For a saw filing machine using a conventional three cornered file and having a reciprocating frame with opposed clamps and a holder in one clamp for engaging one end of the file, the improvement which consists in a holder having an outer sleeve member rotatably positioned in the other clamp, said sleeve member having a bore eccentric to its axis of rotation, and a socket member positioned in the bore and engaging the opposite end of the file, said sleeve member being split along one side of the bore whereby to clamp the socket member therein when the clamp is tightened.

CHARLES C. BORNHOLDT.

REFERENCES CITED

The following references are of record in the file of this patent:

UNITED STATES PATENTS

| Number | Name | Date |
|---|---|---|
| 123,151 | Chapman | Jan. 30, 1872 |
| 202,309 | Wagner | Apr. 9, 1878 |
| 375,011 | Shaw | Dec. 20, 1887 |
| 528,179 | Neff | Oct. 30, 1894 |
| 560,464 | Bertram | May 19, 1896 |
| 963,559 | Hines | July 5, 1910 |
| 1,157,817 | Steudner | Oct. 26, 1915 |
| 1,406,924 | Briggs | Feb. 14, 1922 |
| 1,562,306 | Decheff | Nov. 17, 1925 |
| 1,703,549 | Sergeeff | Feb. 26, 1929 |
| 2,242,363 | Michon | May 20, 1941 |
| 2,421,657 | Speed | June 3, 1947 |

FOREIGN PATENTS

| Number | Country | Date |
|---|---|---|
| 179,066 | Germany | Dec. 6, 1906 |